United States Patent
Sohma et al.

(10) Patent No.: US 9,130,206 B2
(45) Date of Patent: Sep. 8, 2015

(54) METHOD FOR MANUFACTURING RESIN-FRAMED MEMBRANE ELECTRODE ASSEMBLY FOR FUEL CELL

(71) Applicant: HONDA MOTOR CO., LTD., Tokyo (JP)

(72) Inventors: Hiroshi Sohma, Wako (JP); Naoki Mitsuta, Wako (JP); Yukihito Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/709,060

(22) Filed: Dec. 10, 2012

(65) Prior Publication Data
US 2013/0157175 A1 Jun. 20, 2013

(30) Foreign Application Priority Data
Dec. 15, 2011 (JP) .................................. 2011-274332

(51) Int. Cl.
- *H01M 8/04* (2006.01)
- *H01M 8/10* (2006.01)
- *H01M 8/02* (2006.01)

(52) U.S. Cl.
CPC .............. *H01M 8/10* (2013.01); *H01M 8/0273* (2013.01); *H01M 8/1004* (2013.01); *Y02E 60/521* (2013.01)

(58) Field of Classification Search
CPC .. H01M 8/0273; H01M 8/2076; H01M 8/028
USPC ........................................................ 429/535
See application file for complete search history.

(56) References Cited

U.S. PATENT DOCUMENTS

| | | | |
|---|---|---|---|
| 7,993,499 B2 * | 8/2011 | Zuber et al. | 204/252 |
| 2002/0051902 A1 | 5/2002 | Suenaga et al. | |
| 2003/0082430 A1 * | 5/2003 | Suzuki | 429/36 |
| 2007/0298302 A1 * | 12/2007 | Oschmann | 429/33 |
| 2008/0305384 A1 | 12/2008 | Kawashima et al. | |
| 2009/0075140 A1 * | 3/2009 | Hashimoto et al. | 429/30 |
| 2010/0043210 A1 * | 2/2010 | Eickhoff | 29/623.1 |
| 2010/0047649 A1 | 2/2010 | Yamada et al. | |
| 2012/0219874 A1 | 8/2012 | Suzuki et al. | |
| 2013/0183604 A1 * | 7/2013 | Tanaka et al. | 429/480 |

FOREIGN PATENT DOCUMENTS

| | | |
|---|---|---|
| JP | 2007-066766 | 3/2007 |
| JP | 2008-041337 | 2/2008 |

\* cited by examiner

*Primary Examiner* — Stewart Fraser
*Assistant Examiner* — Olatunji Godo
(74) *Attorney, Agent, or Firm* — Mori & Ward, LLP (57) ABSTRACT

In a method for manufacturing a resin-framed membrane electrode assembly for a fuel cell, a membrane electrode assembly structure is held between a first framed diffusion layer and a second framed diffusion layer while the membrane electrode assembly structure is housed in a recess provided in at least one of a first resin frame component and a second resin frame component. The first resin frame component and the second resin frame component are joined to each other to integrate the first framed diffusion layer and the second framed diffusion layer. The first and second resin frame components are located outside an outer peripheral portion of the membrane electrode assembly structure.

13 Claims, 7 Drawing Sheets

BACKGROUND ART

METHOD FOR MANUFACTURING RESIN-FRAMED MEMBRANE ELECTRODE ASSEMBLY FOR FUEL CELL

CROSS-REFERENCE TO RELATED APPLICATIONS

The present application claims priority under 35 U.S.C. §119 to Japanese Patent Application No. 2011-274332, filed Dec. 15, 2011, entitled "METHOD FOR MANUFACTURING RESIN-FRAMED MEMBRANE ELECTRODE ASSEMBLY FOR FUEL CELL". The contents of this application are incorporated herein by reference in their entirety.

BACKGROUND OF THE INVENTION

1. Field of the Invention

The present application relates to a method for manufacturing a resin-framed membrane electrode assembly for a fuel cell.

2. Discussion of the Background

In general, solid polymer electrolyte fuel cells use solid polymer electrolyte membranes formed of polymer ion exchange membranes. According to this type of fuel cells, a membrane electrode assembly (hereinafter also referred to as MEA) including a solid polymer electrolyte membrane sandwiched between an anode and a cathode is held between separators (bipolar plates), each of the anode and the cathode including a catalyst layer (electrode catalyst layer) and a gas diffusion layer (porous carbon). A predetermined number of such fuel cells are stacked to constitute a fuel cell stack which is used as an onboard fuel cell stack.

The MEA of this type is sometimes designed as a step-type MEA in which one of the electrode layers is designed to have a surface area smaller than that of the solid polymer electrolyte membrane and the other electrode layer is designed to have a surface area equal to that of the solid polymer electrolyte membrane. In such a case, framed MEAs equipped with resin frame members are used to reduce the amount of relatively expensive solid polymer electrolyte membranes and to protect the solid polymer electrolyte membranes which are thin and have low strength.

Figure 7:
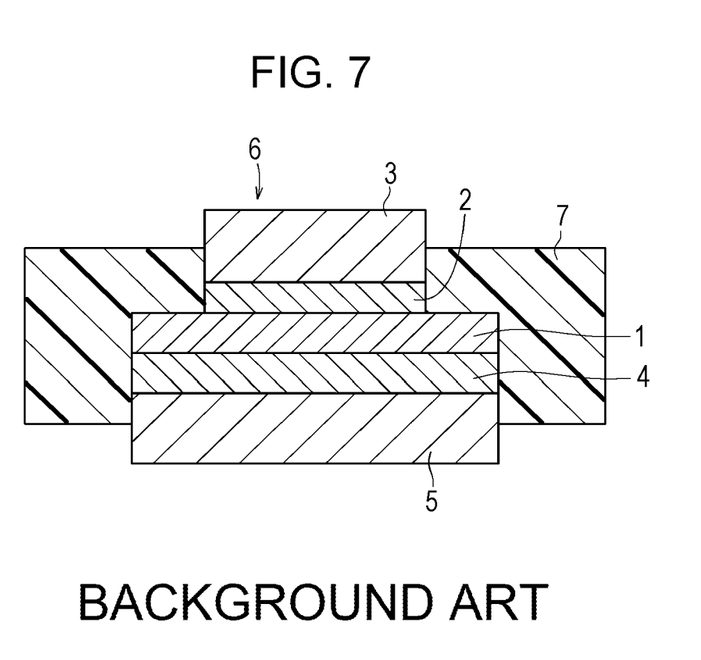
FIG. 7 is a diagram of a MEA according to a related art.

For example, referring to FIG. 7, Japanese Unexamined Patent Application Publication No. 2008-41337 discloses a membrane electrode assembly (MEA 6) that includes a polymer electrolyte membrane 1, a first electrode layer 2 on one of the surfaces of the polymer electrolyte membrane 1, and a first gas diffusion on a surface of the first electrode layer 2 opposite to the polymer electrolyte membrane 1.

The MEA 6 further includes a second electrode layer 4 on the other surface of the polymer electrolyte membrane 1, and a second gas diffusion layer 5 on a surface of the second electrode layer 4 opposite to the polymer electrolyte membrane 1.

The MEA 6 is fitted in a resin frame 7 that surrounds the entire outer peripheral end of the polymer electrolyte membrane 1 and at least the part of the outer peripheral end of the first gas diffusion layer 3 and the second gas diffusion layer 5 so as to cover the side of the electrolyte membrane 1.

The first gas diffusion layer 3 and the first electrode layer 2 are arranged so that the entire outer peripheral end of the first gas diffusion layer 3 is within the outer peripheral end of the polymer electrolyte membrane 1 and that a surface region of the polymer electrolyte membrane 1 remains in a region between the outer peripheral end of the polymer electrolyte membrane 1 and the outer peripheral end of the first electrode layer 2 so that surrounds the entire outer peripheral end of the first electrode layer 2. The second gas diffusion layer 5 extends to at least part of the surface opposite to the surface region over the entire outer peripheral end of the electrolyte. The resin frame 7 is fixed to at least part of the surface region.

SUMMARY OF THE INVENTION

According to one aspect of the present invention, in a method for manufacturing a resin-framed membrane electrode assembly for a fuel cell, a first catalyst layer of a first electrode is attached on a first surface of a solid polymer electrolyte membrane. A second catalyst layer of a second electrode is attached on a second surface of the solid polymer electrolyte membrane. A membrane electrode assembly structure includes the solid polymer electrolyte membrane and the first and second catalyst layers. A first resin frame component is provided around an outer peripheral portion of a first gas diffusion layer of the first electrode to obtain a first framed diffusion layer. A second resin frame component is provided around an outer peripheral portion of a second gas diffusion layer of the second electrode to obtain a second framed diffusion layer. The membrane electrode assembly structure is held between the first framed diffusion layer and the second framed diffusion layer while the membrane electrode assembly structure is housed in a recess provided in at least one of the first resin frame component and the second resin frame component. The first resin frame component and the second resin frame component are joined to each other to integrate the first framed diffusion layer and the second framed diffusion layer. The first and second resin frame components are located outside an outer peripheral portion of the membrane electrode assembly structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
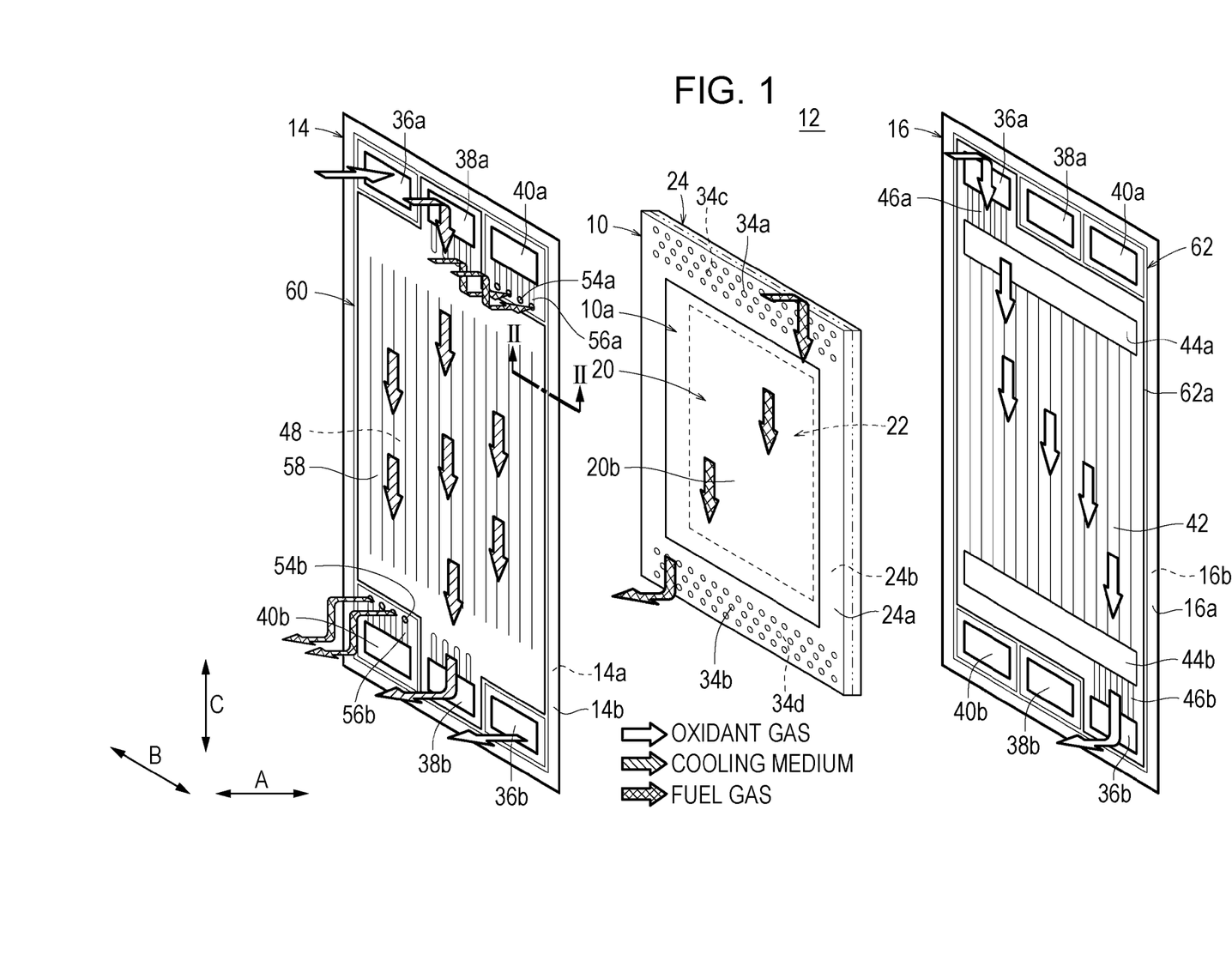
FIG. 1 is an exploded perspective view of a related part of a solid polymer electrolyte fuel cell incorporating a resin-framed MEA manufactured by a method according to an embodiment.
Figure 2:
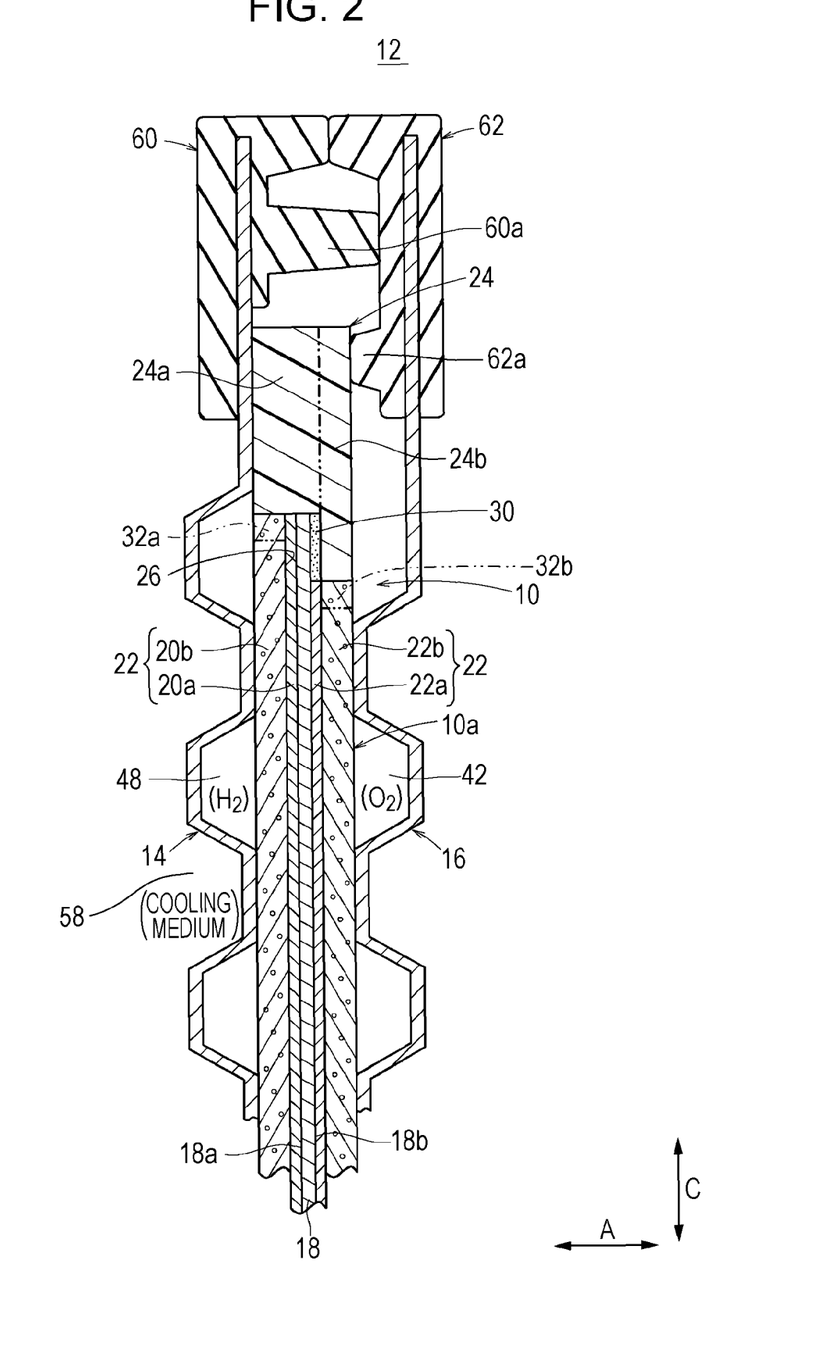
FIG. 2 is a cross-sectional view of the fuel cell taken along line II-II in FIG. 1.

As shown in FIGS. 1 and 2, a resin-framed MEA 10 for fuel cells manufactured by a method according to an embodiment is built into a rectangular solid polymer electrolyte fuel cell 12. A number of solid polymer electrolyte fuel cells 12 are stacked in the arrow A direction to form an vehicle onboard fuel cell stack.

The resin-framed MEA 10 in the fuel cell 12 is held between a first separator 14 and a second separator 16. The first separator 14 and the second separator 16 each have a vertically oriented (or horizontally oriented) rectangular shape and are each constituted by, for example, a steel plate, a stainless steel plate, an aluminum plate, a coated steel plate, a metal plate surface-treated to exhibit corrosion resistance, or a carbon member.

Figure 3:
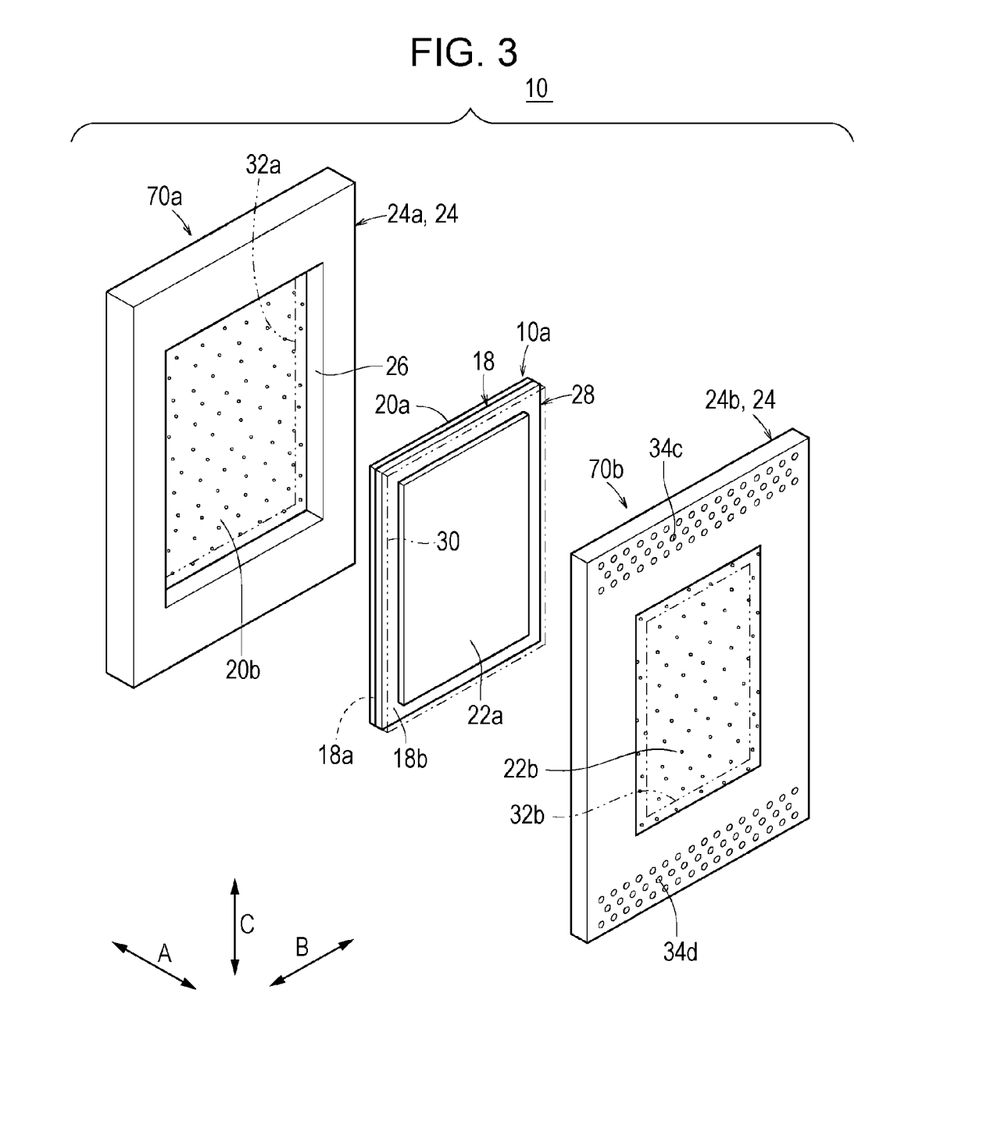
FIG. 3 is an exploded perspective view of a related part of the resin-framed MEA.

As shown in FIGS. 2 and 3, the rectangular resin-framed MEA 10 includes a MEA 10a. The MEA 10a includes, for example, a solid polymer electrolyte membrane 18 which is a perfluorosulfonic acid membrane impregnated with water, and an anode (first electrode) 20 and a cathode (second electrode) 22 that sandwich the solid polymer electrolyte membrane 18. The solid polymer electrolyte membrane 18 may be used with a fluorine-based electrolyte or a hydrocarbon (HC)-based electrolyte. The cathode 22 has a smaller surface area than the solid polymer electrolyte membrane 18 and the anode 20.

The anode 20 includes a first electrode catalyst layer (first catalyst layer) 20a attached to a surface 18a of the solid polymer electrolyte membrane 18 and a first gas diffusion layer 20b stacked on the first electrode catalyst layer 20a. The first electrode catalyst layer 20a and the first gas diffusion layer 20b are designed to have the same external dimensions as each other and the same external dimensions as (or smaller external dimensions than) the solid polymer electrolyte membrane 18.

The cathode 22 includes a second electrode catalyst layer (second catalyst layer) 22a attached to a surface 18b of the solid polymer electrolyte membrane 18 and a second gas diffusion layer 22b stacked on the second electrode catalyst layer 22a. The second electrode catalyst layer 22a and the second gas diffusion layer 22b are designed to have the same external dimensions as each other and smaller external dimensions than the solid polymer electrolyte membrane 18. The second electrode catalyst layer 22a and the second gas diffusion layer 22b are designed to have smaller external dimensions than the first electrode catalyst layer 20a and the first gas diffusion layer 20b.

The first electrode catalyst layer 20a and the second electrode catalyst layer 22a are each prepared by forming catalyst particles composed of carbon black supporting platinum particles, preparing a catalyst paste by homogeneously mixing the catalyst particles in a solution of a polymer electrolyte used as an ion-conductive binder, and printing, applying, or transferring the catalyst paste to both surfaces 18a and 18b of the solid polymer electrolyte membrane 18.

The first gas diffusion layer 20b and the second gas diffusion layer 22b are each formed by applying a base layer containing carbon black and polytetrafluoroethylene (PTFE) particles to a piece of carbon paper. The plane dimensions of the second gas diffusion layer 22b are designed to be smaller than the plane dimensions of the first gas diffusion layer 20b.

As shown in FIGS. 1 to 3, the resin-framed MEA 10 includes a resin frame member 24 attached to the anode 20 and the cathode 22 so as to surround the outer periphery of the solid polymer electrolyte membrane 18. The resin frame member 24 is composed of, for example, polyphenylene sulfide (PPS), polyphthalamide (PPA), polyethylene naphthalate (PEN), polyethersulfone (PES), liquid crystal polymer (LCP), polyvinylidene fluoride (PVDF), silicone rubber, fluorine rubber, or ethylene propylene rubber (EPDM).

As shown in FIGS. 2 and 3, the resin frame member 24 includes a first resin frame component 24a that surrounds the outer periphery of the first gas diffusion layer 20b (for example, integrated with the first gas diffusion layer 20b through welding, bonding, or integral forming) and a second resin frame component 24b that surrounds the outer periphery of the second gas diffusion layer 22b (for example, integrated with the second gas diffusion layer 22b through welding, bonding, or integral forming). As described below, the first resin frame component 24a and the second resin frame component 24b are joined (for example, welded or bonded) so as to form one component that constitutes the resin frame member 24.

The first resin frame component 24a has a recess 26 that houses the solid polymer electrolyte membrane 18. The depth of the recess 26 is set to be equal to the total thickness of the solid polymer electrolyte membrane 18, the first electrode catalyst layer 20a, and the second electrode catalyst layer 22a. The solid polymer electrolyte membrane 18, the first electrode catalyst layer 20a, and the second electrode catalyst layer 22a are combined in advance to form a MEA structure (membrane electrode assembly structure) 28.

An adhesive layer 30 that bonds the second resin frame component 24b to the solid polymer electrolyte membrane 18 is disposed on the surface 18b of the MEA structure 28. The adhesive layer 30 is formed by using, for example, an epoxy-, ester-, or urethane-based hot melt adhesive. The first resin frame component 24a and the first gas diffusion layer 20b of the anode 20 are integrated with each other at a resin impregnation portion 32a. The second resin frame component 24b and the second gas diffusion layer 22b of the cathode 22 are integrated with each other at a resin impregnation portion 32b.

As shown in FIGS. 2 and 3, the adhesive layer 30 is formed on the second resin frame component 24b and has a frame shape covering the entire outer peripheral portion of the solid polymer electrolyte membrane 18. The resin impregnation portion 32a having a frame shape is formed in the peripheral portion of the first gas diffusion layer 20b of the anode 20. The resin impregnation portion 32b having a frame shape is formed in the entire peripheral portion of the second gas diffusion layer 22b of the cathode 22.

As shown in FIG. 1, an inlet buffer portion 34a corresponding to the inlet side of the fuel gas channel described below is formed in an upper end portion of the first-resin-frame-component-24a-side surface of the resin frame member 24. An outlet buffer portion 34b corresponding to the outlet side of the fuel gas channel is formed in a lower end portion of the first-resin-frame-component-24a-side surface of the resin frame member 24. The inlet buffer portion 34a and the outlet buffer portion 34b are constituted by a plurality of projections.

As shown in FIG. 3, an inlet buffer portion 34c corresponding to the inlet side of the oxidant gas channel described below is formed in an upper end portion of a second-resin-frame-component-24b-side surface of the resin frame member 24. An outlet buffer portion 34d corresponding to the outlet side of the oxidant gas channel is formed in a lower end portion of the second-resin-frame-component-24b-side surface of the resin frame member 24. The inlet buffer portion 34c and the outlet buffer portion 34d are constituted by a plurality of projections.

As shown in FIG. 1, an oxidant gas inlet communicating hole 36a for supplying oxidant gas, e.g., oxygen-containing gas, a cooling medium inlet communicating hole 38a for supplying a cooling medium, and a fuel gas inlet communicating hole 40a for supplying fuel gas, e.g., hydrogen-containing gas are formed side-by-side in the arrow B direction (horizontal direction) in the upper end portion of the fuel cell 12 in the arrow C direction (direction of gravitational force in FIG. 1). The oxidant gas inlet communicating hole 36a, the cooling medium inlet communicating hole 38a, and the fuel gas inlet communicating hole 40a each extend in the arrow A direction, i.e., the stacking direction.

A fuel gas outlet communicating hole 40b for discharging the fuel gas, a cooling medium outlet communicating hole 38b for discharging the cooling medium, and an oxidant gas outlet communicating hole 36b for discharging the oxidant gas are formed side-by-side in the arrow B direction in a lower end portion of the fuel cell 12 in the arrow C direction. The fuel gas outlet communicating hole 40b, the cooling medium outlet communicating hole 38b, and the oxidant gas outlet communicating hole 36b each extend in the arrow A direction.

An oxidant gas channel 42 communicating with the oxidant gas inlet communicating hole 36a and the oxidant gas outlet communicating hole 36b is formed in a surface 16a of the second separator 16 facing the resin-framed MEA 10. An inlet buffer region 44a which is substantially flat and which the inlet buffer portion 34c formed in the upper end portion of the second resin frame component 24b abuts is formed on the inlet side (upper end side) of the oxidant gas channel 42. At one end of the upper portion of the inlet buffer region 44a, a plurality of inlet connecting channels 46a are connected to the oxidant gas inlet communicating hole 36a.

An outlet buffer region 44b which the outlet buffer portion 34d formed in the lower end portion of the second resin frame component 24b abuts is formed on the outlet side (lower end side) of the oxidant gas channel 42. At a lower end of the outlet buffer region 44b, a plurality of outlet connecting channels 46b connected to the oxidant gas outlet communicating hole 36b are formed.

Figure 4:
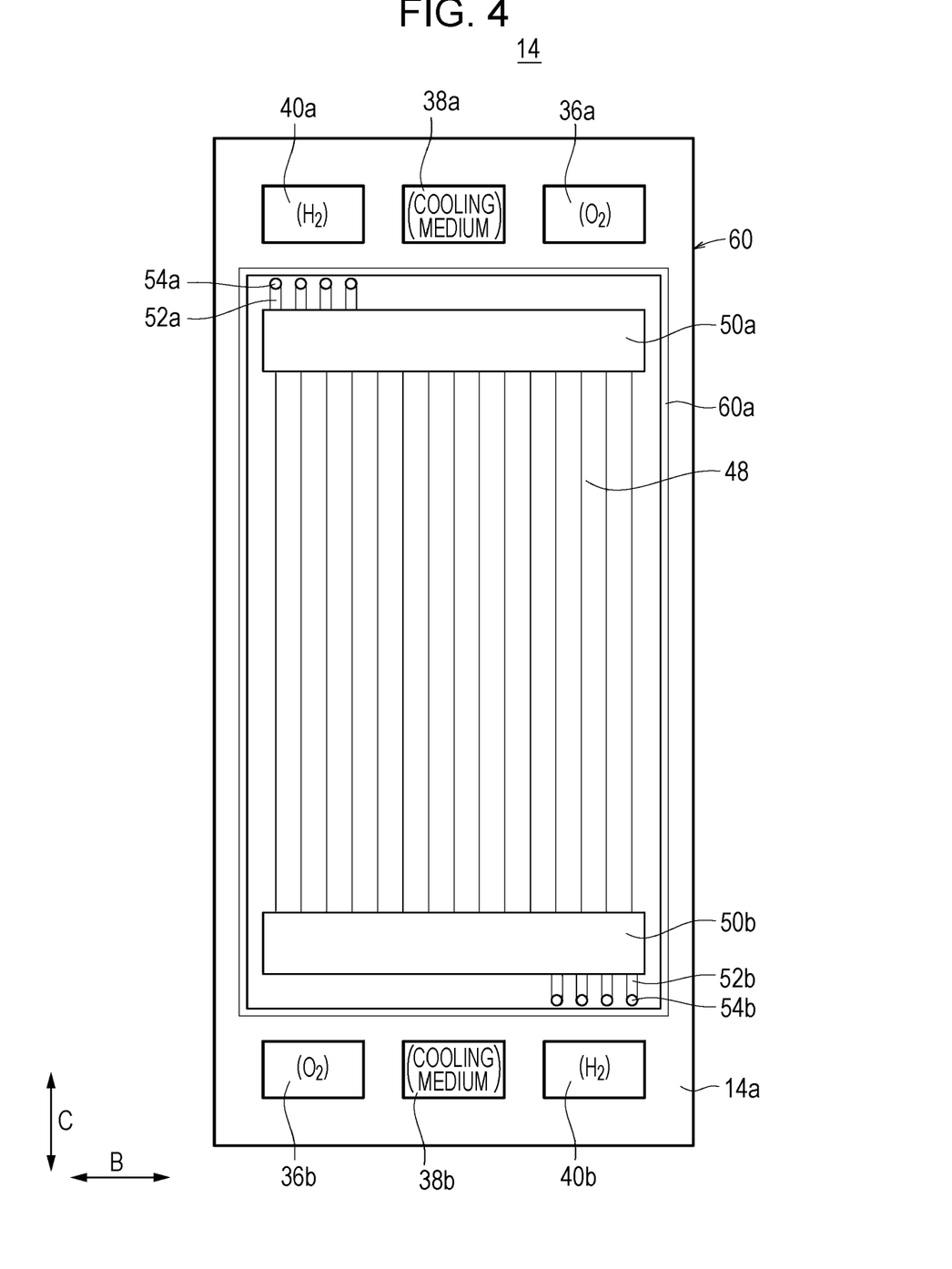
FIG. 4 is a diagram showing one surface of the resin-framed MEA.

Referring to FIG. 4, a fuel gas channel 48 extending in the arrow C direction is formed in a surface 14a of the first separator 14 facing the resin-framed MEA 10. An inlet buffer region 50a which the inlet buffer portion 34a formed in the upper end portion of the first resin frame component 24a abuts is formed on the inlet side (upper end side) of the fuel gas channel 48. A plurality of inlet connecting channels 52a are connected to the fuel-gas-inlet-communicating-hole-40a-side end portion of the inlet buffer region 50a and the inlet connecting channels 52a are in communication with a plurality of supply holes 54a.

An outlet buffer region 50b which the outlet buffer portion 34b formed in the lower end portion of the first resin frame component 24a abuts is formed on the outlet side (lower end side) of the fuel gas channel 48. The fuel-gas-outlet-communicating-hole-40b-side end portion of the outlet buffer region 50b is in communication with discharge holes 54b through a plurality of outlet connecting channels 52b.

Referring to FIG. 1, a plurality of inlet connecting channels 56a that connect the supply holes 54a to the fuel gas inlet communicating hole 40a and a plurality of outlet connecting channels 56b that connect the discharge holes 54b to the fuel gas outlet communicating hole 40b are formed in a surface 14b of the first separator 14. A cooling medium channel 58 is formed in the arrow C direction and connects the cooling medium inlet communicating hole 38a to the cooling medium outlet communicating hole 38b.

As shown in FIGS. 1 and 2, a first seal member 60 extending along the outer peripheral end of the first separator 14 is integrally formed on the surface 14a and the surface 14b of the first separator 14. A second seal member 62 extending along the outer peripheral end of the second separator 16 is integrally formed on a surface 16a and a surface 16b of the second separator 16.

As shown in FIG. 2, the first seal member 60 has a protruding seal 60a contacting the second seal member 62. The second seal member 62 has a protruding seal 62a contacting the resin frame member 24 constituting the resin-framed MEA 10.

The first seal member 60 and the second seal member 62 may be composed of a sealing material, cushioning material, or packing material such as EPDM, NBR, fluororubber, silicone rubber, fluorosilicone rubber, butyl rubber, natural rubber, styrene rubber, chloroprene, or acrylic rubber.

Next, a method for manufacturing the resin-framed MEA 10 is described.

First, as shown in FIG. 3, the first resin frame component 24a and the second resin frame component 24b constituting the resin frame member 24 are formed by injection molding. The first resin frame component 24a is thicker than the second resin frame component 24b. The resin impregnation portion 32a that is thin and protruding toward the inner side is formed in the inner peripheral portion of the first resin frame component 24a, the inner peripheral portion defining the recess 26. The resin impregnation portion 32b is formed in the inner peripheral portion of the second resin frame component 24b.

In the process of manufacturing the first gas diffusion layer 20b and the second gas diffusion layer 22b, a mixture containing carbon black and PTFE particles is homogeneously dispersed in ethylene glycol to prepare a slurry. The slurry is applied to the catalyst-layer-side of a piece of carbon paper and dried. As a result, the first gas diffusion layer 20b and the second gas diffusion layer 22b each constituted by the carbon paper and the base layer are prepared. The base layer may be omitted or provided as needed.

Next, the first gas diffusion layer 20b is placed in the recess 26 of the first resin frame component 24a. At this stage, the outer peripheral portion of the first gas diffusion layer 20b overlaps the resin impregnation portion 32a of the first resin frame component 24a. When the resin impregnation portion 32a is melted, the resin impregnates the outer peripheral portion of the first gas diffusion layer 20b, thereby welding the first gas diffusion layer 20b to the first resin frame component 24a. As a result, a first framed diffusion layer 70a is obtained. The resin impregnation portion 32a may be heated by laser welding, infrared welding, impulse welding, or the like.

The second gas diffusion layer 22b is placed in an open portion of the second resin frame component 24b. The outer peripheral portion of the second gas diffusion layer 22b overlaps the resin impregnation portion 32b of the second resin frame component 24b. When the resin impregnation portion 32b is melted under heating, the resin impregnates the outer peripheral portion of the second gas diffusion layer 22b, thereby welding and integrating the second gas diffusion layer 22b to the second resin frame component 24b. As a result, a second framed diffusion layer 70b is obtained. In the second framed diffusion layer 70b, the adhesive layer 30 having a frame shape is formed along the entire outer peripheral portion of the second gas diffusion layer 22b.

The first electrode catalyst layer 20a and the second electrode catalyst layer 22a are formed on a surface 18a and a surface 18b of the solid polymer electrolyte membrane 18, respectively. In particular, an electrode ink is applied to a PET sheet by screen-printing to form an electrode sheet, and the solid polymer electrolyte membrane 18 is interposed between the electrode sheets and subjected to hot-pressing, followed by separation of the PET sheet. As a result, the first electrode catalyst layer 20a and the second electrode catalyst layer 22a are formed on the surface 18a and the surface 18b of the solid polymer electrolyte membrane 18 and the MEA structure 28 is obtained.

Next, the MEA structure 28 is placed in the recess 26 of the first framed diffusion layer 70a. While the MEA structure 28 is held between the first framed diffusion layer 70a and the second framed diffusion layer 70b, a hot press treatment is conducted. As a result, the first electrode catalyst layer 20a of the MEA structure 28 is integrated with the first gas diffusion layer 20b and the second electrode catalyst layer 22a of the MEA structure 28 is integrated with the second gas diffusion layer 22b.

The first framed diffusion layer 70a and the second framed diffusion layer 70b which are located outside the outer periphery of the solid polymer electrolyte membrane 18 are welded to each other and become integrated, thereby forming the resin frame member 24. During this process, the adhesive layer 30 on the second framed diffusion layer 70b bonds the second resin frame component 24b to the outer peripheral portion of the solid polymer electrolyte membrane 18. Cooling is conducted for a predetermined time and as a result the resin-framed MEA 10 is manufactured.

The resin-framed MEA 10 is held between the first separator 14 and the second separator 16 so as to form the fuel cell 12. A predetermined number of fuel cells 12 are stacked to form a fuel cell stack and a clamping load is applied to end plates (not shown in the drawings).

The operation of the fuel cell 12 configured as such will now be described.

First, as shown in FIG. 1, oxidant gas such as oxygen-containing gas is supplied to the oxidant gas inlet communicating hole 36a and fuel gas such as hydrogen-containing gas is supplied to the fuel gas inlet communicating hole 40a. A cooling medium such as pure water, ethylene glycol, or oil is supplied to the cooling medium inlet communicating hole 38a.

The oxidant gas is introduced to the oxidant gas channel 42 of the second separator 16 through the oxidant gas inlet communicating hole 36a, travels in the arrow C direction, and is supplied to the cathode 22 of the MEA 10a. Meanwhile, the fuel gas passes through the supply holes 54a from the fuel gas inlet communicating hole 40a and is introduced to the fuel gas channel 48 of the first separator 14. The fuel gas travels in the arrow C direction along the fuel gas channel 48 and is supplied to the anode 20 of the MEA 10a.

Thus, the oxidant gas supplied to the cathode 22 and the fuel gas supplied to the anode 20 undergo an electrochemical reaction in the electrode catalyst layers in the MEA 10a and are consumed to generate power.

The oxidant gas supplied to the cathode 22 and consumed is discharged in the arrow A direction through the oxidant gas outlet communicating hole 36b. Similarly, the fuel gas supplied to the anode 20 and consumed passes through the discharge holes 54b and is discharged in the arrow A direction through the fuel gas outlet communicating hole 40b.

The cooling medium supplied to the cooling medium inlet communicating hole 38a is introduced to the cooling medium channel 58 between the first separator 14 and the second separator 16 and is distributed in the arrow C direction. The cooling medium cools the MEA 10a and is discharged from the cooling medium outlet communicating hole 38b.

In such a case, according to this embodiment, as shown in FIGS. 2 and 3, while the first framed diffusion layer 70a is obtained by welding the first resin frame component 24a to the outer peripheral portion of the first gas diffusion layer 20b through the resin impregnation portion 32a, the second framed diffusion layer 70b is obtained by welding the second resin frame component 24b to the outer peripheral portion of the second gas diffusion layer 22b through the resin impregnation portion 32b.

Then, while the MEA structure 28 is held between the first framed diffusion layer 70a and the second framed diffusion layer 70b, the first resin frame component 24a and the second resin frame component 24b are welded to each other so as to integrate the first framed diffusion layer 70a and the second framed diffusion layer 70b and so as to form the resin frame member 24. In this process, an adhesive is applied to the exposed portion in the outer periphery of the MEA 10a.

Accordingly, during the process of integrating the resin frame member 24 with the outer peripheral portion of the MEA 10a, excess heat is not applied to the solid polymer electrolyte membrane 18 constituting the MEA 10a. Accordingly, deterioration of the solid polymer electrolyte membrane 18 by heat can be effectively suppressed.

Moreover, since the first framed diffusion layer 70a and the second framed diffusion layer 70b are formed in advance, it becomes possible to reliably cover the outer peripheral portions of the first gas diffusion layer 20b and the second gas diffusion layer 22b with the resin. As a result, carbon fibers contained in the first gas diffusion layer 20b and the second gas diffusion layer 22b can be prevented from pricking the solid polymer electrolyte membrane 18 and the deterioration of the solid polymer electrolyte membrane 18 can be satisfactorily suppressed.

Moreover, the first framed diffusion layer 70a has the recess 26 for housing the MEA structure 28 that includes the solid polymer electrolyte membrane 18. Accordingly, the adjustment of the position of the MEA structure 28 can be easily and accurately executed and workability can be improved. Note that the recess 26 may be formed on the second framed diffusion layer 70b side.

Figure 5:
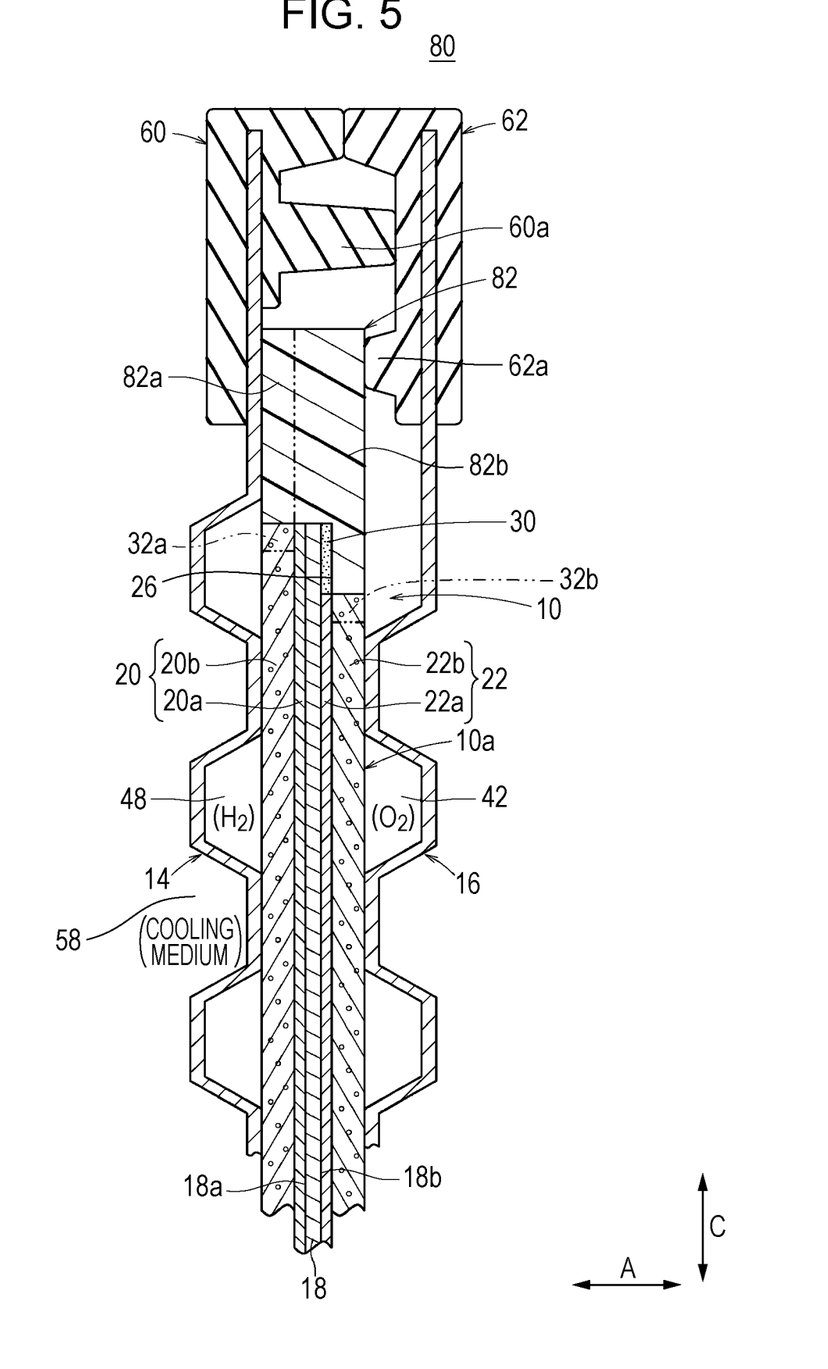
FIG. 5 is a cross-sectional view of another embodiment of the resin-framed MEA.

A resin-framed MEA 80 for fuel cells shown in FIG. 5 includes a resin frame member 82 that includes a first resin frame component 82a and a second resin frame component 82b. The first resin frame component 82a is formed around the outer peripheral portion of the first gas diffusion layer 20b and the second resin frame component 82b is formed around the outer peripheral portion of the second gas diffusion layer 22b. The recess 26 housing the MEA structure 28 is formed in the second resin frame component 82b.

Figure 6:
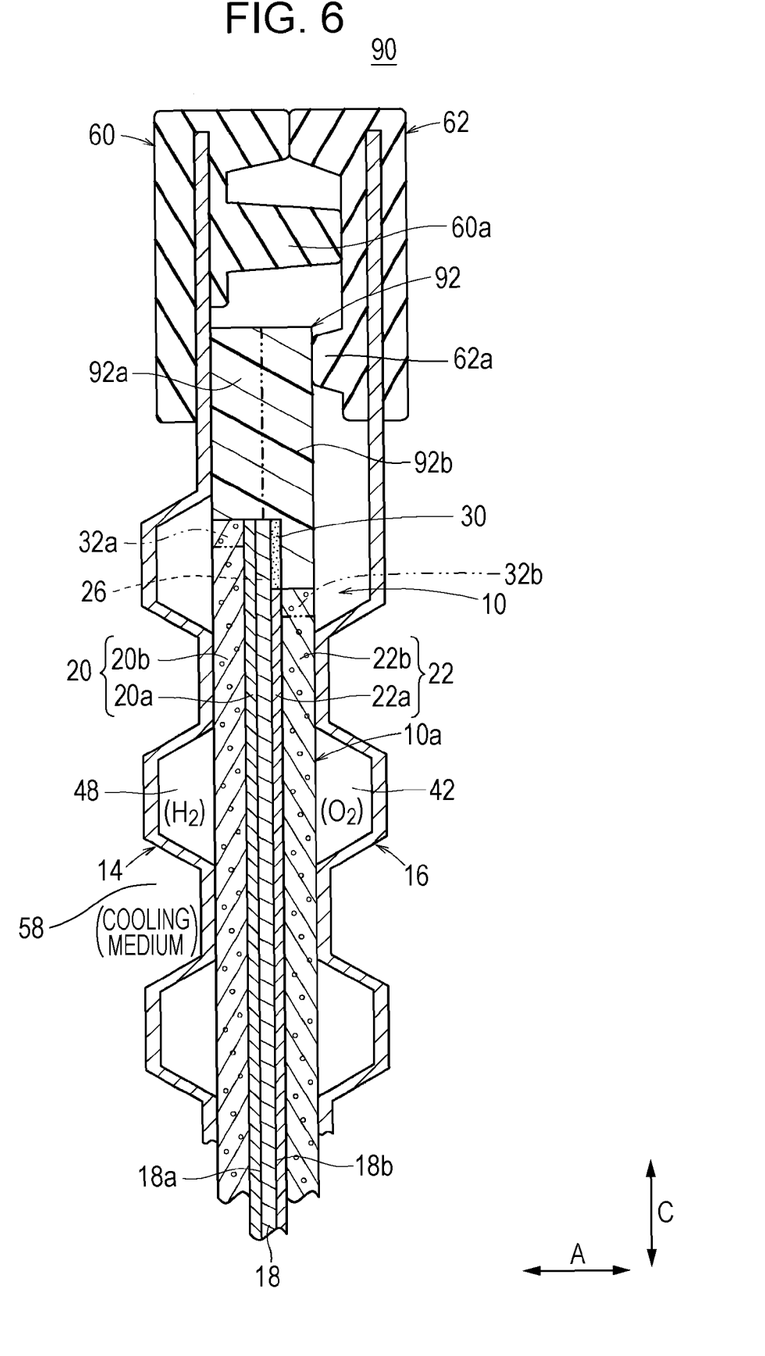
FIG. 6 is a cross-sectional view of another embodiment of the resin-framed MEA.

A resin-framed MEA 90 for fuel cells shown in FIG. 6 includes a resin frame member 92 that includes a first resin frame component 92a and a second resin frame component 92b. The first resin frame component 92a is formed around the outer peripheral portion of the first gas diffusion layer 20b and the second resin frame component 92b is formed around the outer peripheral portion of the second gas diffusion layer 22b. The recess 26 for housing the membrane electrode assembly structure 28 is formed in both the first resin frame component 92a and the second resin frame component 92b.

According to the method of the embodiment, a resin-framed membrane electrode assembly for a fuel cell includes a solid polymer electrolyte membrane, a first electrode on one surface of the solid polymer electrolyte membrane, and a second electrode on the other surface of the solid polymer electrolyte, the first electrode including a first catalyst layer and a first gas diffusion layer, the second electrode including a second catalyst layer and a second gas diffusion layer, the first gas diffusion layer having larger plane dimensions than the second gas diffusion layer.

This method according to the embodiment includes a step of attaching a first catalyst layer on one surface of the solid polymer electrolyte membrane and attaching a second catalyst layer on the other surface of the solid polymer electrolyte membrane to obtain a membrane electrode assembly structure; a step of forming a first resin frame component around an outer peripheral portion of the first gas diffusion layer to obtain a first framed diffusion layer and forming a second resin frame component around an outer peripheral portion of the second gas diffusion layer to obtain a second framed diffusion layer; a step of holding the membrane electrode assembly structure between the first framed diffusion layer and the second framed diffusion layer while housing the membrane electrode assembly structure in a recess formed in the first resin frame component or the second resin frame component; and a step of joining the first resin frame component and the second resin frame component to each other, the first and second resin frame component being located outside the outer peripheral end of the membrane electrode assembly structure, so as to integrate the first framed diffusion layer and the second framed diffusion layer.

According to this method of the embodiment, when the resin frame is integrated with the outer peripheral portion of the MEA, excess heat is not applied to the solid polymer electrolyte membrane in the MEA. Accordingly, deterioration of the solid polymer electrolyte membrane of the embodiment by heat can be effectively suppressed.

Moreover, since the first framed diffusion layer and the second framed diffusion layer are formed, the outer peripheral portions of the first and second gas diffusion layers can be more reliably covered with resin. Thus, carbon fibers do not readily prick the solid polymer electrolyte membrane and deterioration of the solid polymer electrolyte membrane can be satisfactorily suppressed.

A recess for housing the membrane electrode assembly structure of the embodiment is formed in the first resin frame component or the second resin frame component. Thus, alignment of the membrane electrode assembly structure is accurately executed and the workability is improved.

Preferably, the outer peripheral portion of the solid polymer electrolyte membrane of the embodiment is fixed to the second framed diffusion layer with an adhesive.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a resin-framed membrane electrode assembly for a fuel cell, the method comprising:
    attaching a first catalyst layer of a first electrode on a first surface of a solid polymer electrolyte membrane;
    attaching a second catalyst layer of a second electrode on a second surface of the solid polymer electrolyte membrane to form a membrane electrode assembly structure including the solid polymer electrolyte membrane and the first and second catalyst layers;
    providing a first resin frame component around an outer peripheral portion of a first gas diffusion layer of the first electrode to form a first framed diffusion layer;
    providing a second resin frame component around an outer peripheral portion of a second gas diffusion layer of the second electrode to form a second framed diffusion layer;
    holding the membrane electrode assembly structure between the first framed diffusion layer and the second framed diffusion layer while the membrane electrode assembly structure is housed in a recess provided in at least one of the first resin frame component and the second resin frame component;
    joining and integrating the first resin frame component and the second resin frame component to each other to integrate the first framed diffusion layer and the second framed diffusion layer, the first and second resin frame components being located outside an outer peripheral portion of the membrane electrode assembly structure,
    wherein the joining and integrating of the first resin frame component and the second resin frame component further includes:
        joining the first framed diffusion layer and the first catalyst layer; and
        joining the second framed diffusion layer and the second catalyst layer,
    wherein the method further comprises fixing an outer peripheral portion of the solid polymer electrolyte membrane to the second framed diffusion layer with an epoxy-, ester-, or urethane-based hot melt adhesive, and
    wherein the first resin frame component is welded by laser welding, infrared welding, or impulse welding to the first gas diffusion layer to provide the first framed diffusion layer.

2. The method according to claim 1, further comprising:
    fixing an outer peripheral portion of the solid polymer electrolyte membrane to the second framed diffusion layer with an adhesive.

3. The method according to claim 1, wherein the joining of the first and second resin frame components includes welding the first resin frame component and the second resin frame component to each other.

4. The method according to claim 3, further comprising:
    cooling the first resin frame component and the second resin frame component for a predetermined time after the welding of the first and second resin frame components.

5. The method according to claim 1, wherein the first gas diffusion layer has a plane dimension larger than a plane dimension of the second gas diffusion layer.

6. The method according to claim 1, wherein the first framed diffusion layer and the second framed diffusion layer are formed prior to the holding of the membrane electrode assembly structure between the first framed diffusion layer and the second framed diffusion layer.

7. The method according to claim 1,
    wherein the first framed diffusion layer is obtained by the providing of the first resin frame component around the outer peripheral portion of the first gas diffusion layer of the first electrode fusion layer, and integrating a portion of the first resin frame component with the outer peripheral portion of the first gas diffusion layer of the first electrode fusion layer to form a first resin impregnation portion.

8. The method according to claim 7,
    wherein the second framed diffusion layer is obtained by the providing of the second resin frame component around the outer peripheral portion of the second gas diffusion layer of the second electrode fusion layer, and integrating a portion of the second resin frame component with the outer peripheral portion of the second gas diffusion layer of the second electrode fusion layer to form a second resin impregnation portion.

9. The method according to claim 8, wherein the first framed diffusion layer and the second framed diffusion layer are formed prior to the holding of the membrane electrode assembly structure between the first framed diffusion layer and the second framed diffusion layer.

10. The method according to claim 8,
wherein the first resin impregnation portion is formed by melting under heat, and
wherein the second resin impregnation portion is formed by melting under heat.

11. The method according to claim 10, wherein the first framed diffusion layer and the second framed diffusion layer are formed prior to the holding of the membrane electrode assembly structure between the first framed diffusion layer and the second framed diffusion layer.

12. The method according to claim 1, wherein the membrane electrode assembly structure is formed prior to the holding of the membrane electrode assembly structure between the first framed diffusion layer and the second framed diffusion layer.

13. The method according to claim 1, wherein, prior to the joining and integrating the first resin frame component and the second resin frame component to each other, the first framed diffusion layer and the second framed diffusion layer are separately disposed and the first resin frame component and the second resin frame component are separate and distinct.

\* \* \* \* \*